United States Patent [19]

Salemme et al.

[11] 4,155,793

[45] May 22, 1979

[54] CONTINUOUS PREPARATION OF ULTRATHIN POLYMERIC MEMBRANE LAMINATES

[75] Inventors: Robert M. Salemme, Schenectady; Warella R. Browall, Scotia, both of N.Y.

[73] Assignee: General Electric Company, Schenectady, N.Y.

[21] Appl. No.: 853,087

[22] Filed: Nov. 21, 1977

[51] Int. Cl.² .................. B29D 7/06; B29D 27/04
[52] U.S. Cl. ............................. 156/246; 264/298
[58] Field of Search ............ 156/246; 264/204, 207, 264/216, 298

[56] References Cited

U.S. PATENT DOCUMENTS

| | | | |
|---|---|---|---|
| 3,580,841 | 5/1971 | Cadotte et al. | 210/23 |
| 3,767,737 | 10/1973 | Lundstrom | 264/298 |
| 3,874,986 | 4/1975 | Browall et al. | 156/285 |
| 3,933,561 | 1/1976 | Larson et al. | 156/246 |
| 3,980,456 | 9/1976 | Browall | 156/94 |

FOREIGN PATENT DOCUMENTS 2420846  11/1974  Fed. Rep. of Germany ........... 264/298

OTHER PUBLICATIONS

"A New Material and Techniques for the Fabrication and Measurement of Very Thin Films for use in 4π--Counting", Pate & Jaffe, Canad. J. Chem., vol. 33, pp. 15-23 (1955).

*Primary Examiner*—Caleb Weston
*Attorney, Agent, or Firm*—Richard G. Jackson; Joseph T. Cohen; Leo I. MaLossi

[57] ABSTRACT

A composite laminar membrane including a flexible microporous support layer and at least one ultrathin permeable nonporous polymeric membrane of 500 angstroms or less in thickness is prepared by a continuous process. A liquid substrate having a well in its upper surface is provided and polymer-containing casting solution is continuously supplied to the well to effect continuous solution spreading across the liquid surface. Solvent is removed and a web of the support material is continuously contacted with the resulting ultrathin membrane to continuously remove it upwardly from a region of the liquid surface. In a preferred embodiment, an additional well spaced from the removal region is employed for producing an additional membrane, which is continuously removed from its liquid surface in contiguous contact with the liquid-contact surface of the first membrane.

10 Claims, 2 Drawing Figures

CONTINUOUS PREPARATION OF ULTRATHIN POLYMERIC MEMBRANE LAMINATES

BACKGROUND OF THE INVENTION

This invention relates to a continuous process for preparing composite laminar membranes including a flexible microporous support and at least one ultrathin permeable nonporous polymeric membrane of 500 angstroms or less in thickness.

Methods employing liquid casting substrates for preparing thin semipermeable membranes of a variety of polymeric materials are known in the art. A method for solvent casting of ultrathin nonporous membranes on a liquid substrate is described in copending U.S. patent application Ser. No. 536,650 (Ward) filed Dec. 26, 1974, assigned to the assignee hereof, and incorporated herein by reference. Although as described therein relatively large (e.g., one square foot or more in area) ultrathin films may be prepared by the Ward method, the area thereof is limited by the area of the liquid casting substrate employed. Moreover, as taught therein, composites of one or more ultrathin membranes on a microporous backing layer are prepared using a vacuum pickup method wherein a differential pressure is applied across the ultrathin membranes during composite formation. Other batch casting methods employing liquid casting surfaces are described by Cadotte et al. in U.S. Pat. No. 3,580,841 and by Pate and Yaffe in Canad. J. Chem., Vol. 33, pp. 15-23 (1955). The present invention provides significant improvements over the method of the Ward application in that (1) the area of the composite membrane is not limited by the liquid surface area, (2) the films need not be subjected to applied differential pressure for application to the microporous backing, and (3) the composite laminar membrane is formed continuously.

In U.S. Pat. No. 3,767,737, Lundstrom teaches a process for producing thin polymer membranes, which includes continuously transferring a polymer-containing casting solution upwardly (employing, e.g., a roll) through a support liquid floating thereon for deposition on the upper surface of the liquid. After desolvation, the resulting continuous membrane is picked up on a flexible support passed under an osculation roller. The thickness of membranes provided from a polymer including alternating blocks of repeating units comprising bisphenol-A carbonate units and dimethylsiloxane units in this method is described in the patent as between about 0.005 mil (1,300 angstroms) and 0.05 mil (13,000 angstroms). Although the Lundstrom method represents a substantial advance in the art, the present invention provides significant improvements thereover in that (1) a solution transfer roll and the attendant power consumption are not required; (2) substantially thinner membranes can be prepared; (3) essentially simultaneously two ultrathin membranes may be formed and picked up on a backing layer in a single operation; (4) there is less risk of forming membranes with localized wet spots and variations in thickness; (5) there is less risk of loss of polymer through buildup on solid surfaces; and (6) there is less risk of disturbance of the liquid casting surface.

Larson et al., U.S. Pat. No. 3,933,561, describes a semi-continuous process for casting polymer films of thickness less than 25,000 angstroms wherein a solution of film-forming material is passed down an inclined surface under a thickness-control blade to a liquid casting surface. The film is continuously laminated to a release substrate. No blade is required in the present invention.

Thin films formed of organopolysiloxane-polycarbonate (PSPC) interpolymer and blends or mixtures thereof with polyphenylene oxide (PPO) as well as laminar composites of such films supported on a microporous backing layer are described in U.S. Pat. Nos. 3,980,456 (Browall) and 3,874,986 (Browall et al.) The Browall et al. U.S. Pat. No. 3,874,986 discloses use of a PSPC layer as an adhesive cushion intermediate the backing and a PPO-PSPC layer, while the Browall U.S. Pat. No. 3,980,456 describes use of a PSPC layer as an overcoat pinhole sealing membrane. The foregoing patents are incorporated herein by reference.

It has now been found by practice of the present invention that composite laminar membranes including a microporous backing layer and an ultrathin nonporous membrane of 500 angstroms or less in thickness can be prepared in continuous manner. It has further been found that such membranes additionally including a second such ultrathin membrane can be prepared continuously in a single operation.

DESCRIPTION OF THE INVENTION

Generally stated, the present invention provides a continuous process for preparing a composite laminar membrane including a flexible microporous support layer and at least one ultrathin permeable nonporous polymeric membrane of 500 angstroms or less in thickness. A casting solution comprising a polymer capable of forming the ultrathin membrane and a volatile solvent is prepared. A liquid substrate having a well in the upper surface thereof is provided and the casting solution is continuously supplied to the well. The solution is supplied at a rate sufficient to effect continuous and spontaneous spreading of solution from the well across the surface of the liquid substrate. Spreading is preferably effected without contacting the casting solution in the well with a moving transfer surface. As the casting solution spreads across the liquid surface at least enough of the solvent is removed by evaporation to produce the ultrathin membrane on the liquid surface. A flexible web of the support layer material is continuously passed into contact with the exposed (i.e., non-liquid contacting) surface of the ultrathin membrane to continuously remove it upwardly from a region of the liquid surface.

In a preferred embodiment the liquid substrate is provided with an additional well in its upper surface which is located on the opposite side of the removal region from the previous well such that a portion of the liquid surface extends from the additional well to the removal region. An additional quantity of casting solution is continuously supplied to the second well to effect continuous and simultaneous spreading thereof across the additional liquid surface portion toward the removal region. Solvent is removed from the additional spreading solution to produce an additional membrane (in the above manner), which is continuously removed from its liquid-casting surface in contiguous contact with the liquid-contact surface of the first membrane. In this embodiment, the support web is preferably passed under a rotatable roller extending below the plane of the liquid surface.

BRIEF DESCRIPTION OF THE DRAWING

This invention will be better understood from the following detailed description taken with the accompanying drawing wherein like numerals refer to similar elements throughout and.

Figure 1:
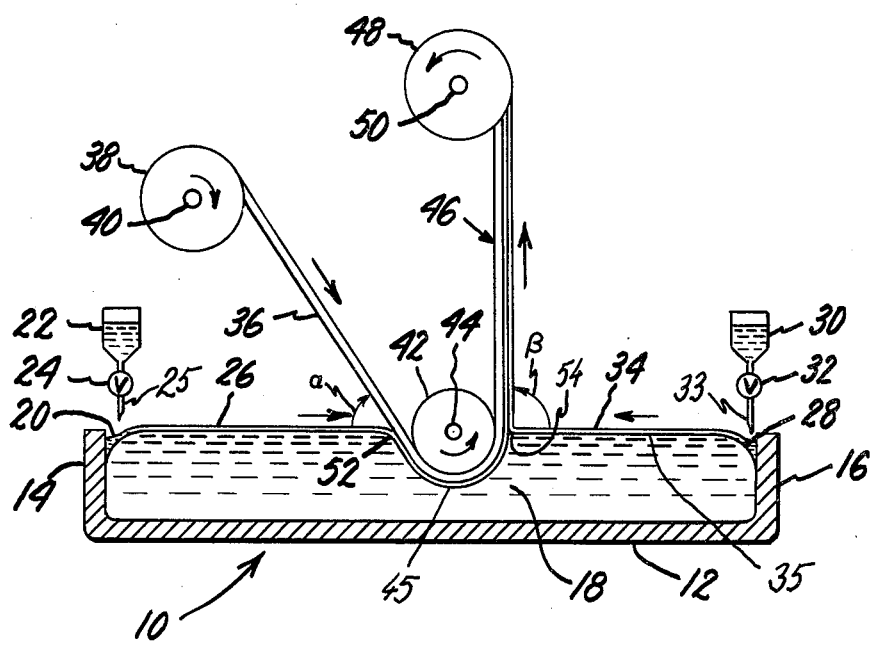
FIG. 1 is an elevation view, partly in section, schematically illustrating apparatus suitable for practicing this invention.
Figure 2:
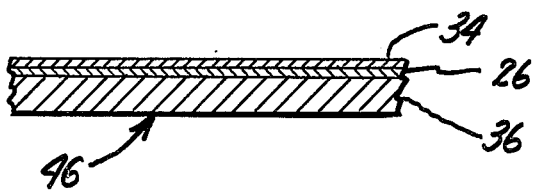
FIG. 2 is an enlarged sectional view of a composite laminar membrane prepared by the process of this invention.

DETAILED DESCRIPTION OF THE INVENTION AND MANNER AND PROCESS OF MAKING AND USING IT

Referring now to the drawing, apparatus or arrangement 10 (FIG. 1) suitable for carrying out the process of this invention includes container 12 having upstanding walls 14 and 16 with liquid bath or casting substrate 18 therein. The upper surface of the substrate has wells 20 and 28 therein at opposite ends thereof adjacent their respective upstanding container walls. The wells are defined by convex meniscuses which result from employing upstanding wall inner surfaces which are non-wettable by the liquid substrate employed. Upstanding walls formed of or coated with polytetrafluoroethylene are preferred.

A casting solution is prepared comprising a polymer capable of forming an ultrathin nonporous permeable membrane of 500 angstroms or less in thickness and a volatile solvent therefor. The casting solution may be prepared in situ in the vessel of dispenser assembly 22, which is provided with control valve 24 and spout 25, or introduced into the dispenser from a different preparation vessel. For start-up an initial quantity of the solution is dispensed through control valve 24 and spout 25 to fill well 20 to an incipient solution spreading mode. The lateral extent of the opening in spout 25 may be substantially coextensive with the length of the well (running perpendicularly to the plane of the drawing) for more uniform dispensing into and spreading out of the well. Thereafter, casting solution is continuously supplied from dispenser 22 to well 20 at a volumetric rate sufficient to effect continuous and spontaneous spreading of solution from the well across the surface of the liquid substrate toward pick-up roll 42. As illustrated in FIG. 1, such spreading can be, and preferably is, effected without contacting the casting solution in the well with a moving transfer surface. As the solution or membrane 26 being formed moves across the surface, the solvent is evaporated therefrom at least to an extent to form a substantially solidified ultrathin membrane.

Flexible web 36 of microporous material is continuously and sequentially unwound from supply roll 38 mounted on rotatable shaft 40, passed around roll 42 mounted on rotatable shaft 44, and taken up (with at least one ultrathin membrane thereon) on take-up roll 48 mounted on driven rotatable shaft 50. Nonporous permeable ultrathin membrane 26 of 500 angstroms or less in thickness in continuously picked up by advancing web 36. Adhering contact is formed between the web and membrane along contact line 52 to form composite laminar membrane 45 in accordance with an embodiment of the process of this invention.

Laminar composite 45 includes flexible support layer 36 having ultrathin membrane 26 in adhering contact therewith. The continuously formed composite is continuously taken up by winding (e.g., spirally) around roll 48.

In a preferred embodiment of the present invention, there is continuously produced composite laminar membrane 46 formed of composite 45 further including additional ultrathin membrane 34, which may be 500 angstroms or less in thickness and may be of the same or different composition as ultrathin membrane 26. In this preferred embodiment, additional well 28 is employed for receiving additional casting solution from dispenser assembly 30 through control valve 32 and spout 33 thereof which assembly may be substantially identical to dispenser assembly 22. The additional casting solution (hereinafter referred to as solution II) may be of the same or different composition (polymer type, solvent type, and polymer concentration in the solvent, etc.) relative to the composition of the solution supplied to well 20. Solution II is continuously supplied to well 28 at a rate sufficient to effect continuous and simultaneous spreading of solution from the additional well across liquid surface portion 35 toward removal region 54. As described above for formation of membrane 26, at least enough solvent is removed from the spreading solution II by evaporation therefrom to produce additional ultrathin membrane 34 on the liquid surface. This additional membrane is picked up near region 54 in contiguous contact with the liquid-contact surface of web-supported membrane 26 substantially as it emerges upwardly from the liquid surface.

As shown in FIG. 1, membrane 34 undergoes a generally abrupt change of direction in changing from the floating mode to the picked-up mode (the latter being illustrated as generally vertical in the drawing). Stresses on membrane 34 while undergoing such change of direction may be minimized by employing a pick-up angle $\beta$ (between the direction of movement of the floating membrane 34 and the direction of movement of upwardly advancing web-membrane composite 45 at the removal region, i.e., at or near the line of contact therebetween) of from about 45° to about 165°, preferably from about 60° to 150° and more preferably about 105° (slightly larger than illustrated). The angle $\alpha$ (between the direction of movement of floating membrane 26 and the direction of movement of advancing web 36 which angle has an apex at 52) may have any suitable value. Desirably, angle $\alpha$ is from about 15° to about 135°, preferably from about 30° to about 120° and more preferably about 45° (as illustrated). Preferably, roller 42 is cylindrical and disposed with the axis of its shaft 44 in substantially coplanar alignment with the surface of the liquid bath. By having the axis of shaft 44 in substantially coplanar arrangement with the liquid surface, angle $\beta$ may readily be controlled at the preferred value of 105°.

Spouts 25 and 33 may extend into the wells 20 and 28 respectively, but preferably are mounted a short distance, e.g., from about 1 to about 3 millimeters, above the surface of the solution contained in the wells for minimum disruption of the solution and substrate surface.

The thickness of the membrane or membranes prepared by the process described above is controlled by: (1) the rate at which the casting solution is delivered to the generally planar casting substrate surface, which in turn is controlled by the rate of dispensing solution to the well or wells when filled to an incipient spreading state, providing that sufficient time is made available for the solvent to substantially completely evaporate before the membrane reaches its take-up surface (the moving web or in the case of the additional membrane, the initially composited web and membrane); (2) the concentration of polymer in the casting solution or solutions employed (lower concentrations provide thinner films); (3) the rate at which the support web is drawn upwardly from the liquid substrate on takeup roll 48 (the faster the rotation of the roll, the thinner the polymeric membrane will be). As used herein "the incipient spreading state" corresponds to that depth of solution in a well which if maintained by replenishing the well-contained solution volume will sustain continuous spreading of a substantially uniform film of casting solution across the generally planar surface of the liquid. The incipient spreading state for any given combination of casting solution and liquid substrate will depend on the surface tension between the liquid and casting solution, the solution viscosity and the linear speed of the advancing web and may be readily determined without undue experimentation for a given set of conditions.

In view of the lower tensile strength of the extremely thin membranes which are formed in the present process, it is surprising that a first moving ultrathin membrane can continuously draw a second ultrathin membrane in sliding manner across the surface of a portion of a liquid support and pick it up without rupturing either membrane. Composite membranes having two ultrathin layers disposed on a flexible support may advantageously be formed by the present process with minimum contamination by contaminants which may be carried in the gaseous environment above the liquid bath. This feature is attributed to the substantially simultaneous removal of the two ultrathin membranes from the bath substantially without exposing the liquid-contacting side of either ultrathin membrane to the gaseous environment. By not requiring either doctor blades or moving surfaces for deposition of the solution and control of the deposited film thickness on the liquid substrate, thinner films of more uniform thickness may be continuously formed. If desired, the supply roll 38 and turnaround roll 42 or either of them may also be driven to prevent compression or undue stretching of the ultrathin membrane or membranes.

Film-forming polymeric compositions suitable for use in the practice of this invention include, in general, any polymer or interpolymer of two or more monomer units, including graft and block interpolymers and the like as well as blends of any of the foregoing, capable of formation into substantially hole-free film by solvent casting. Such polymeric compositions are referred to hereinafter simply as "polymer" or "polymers." Preferably, the polymer included as part of the casting system employed in this invention is substantially insoluble in the film-support liquid; is substantially nonswollen thereby; and is soluble in a normally liquid solvent, which in turn is preferably substantially immiscible with the film-support liquid.

The polymers may be natural or synthetic. In the latter instance, both addition and condensation polymers are suitable. Organic, inorganic or mixed organic and inorganic polymers may be used.

Useful polymers include, for example, those having repeating units selected from the group consisting of arylene ether, organosiloxane, aromatic carbonate, alkyl acrylate, alkyl methacrylate units, and blends and graft or block interpolymers comprising one or more polymeric specie of the foregoing units.

Composite laminar membranes prepared by the process of this invention are useful as gas separation membranes. For oxygen enrichment of air, there may be employed at least one and preferably two (or more) ultrathin nonporous $O_2$ permeable membranes, each membrane comprising one or more organopolysiloxane-polycarbonate (PSPC) interpolymers or a mixture of polyphenylene oxide (PPO) and PSPC. At least one membrane preferably comprises a PSPC-PPO admixture.

PSPC interpolymers preferred for use alone or in admixture with PPO polymers in the one or two ultrathin film components of the composite laminar membrane include repeating units comprising bisphenol-A carbonate (BAC) units and dimethylsiloxane (DMS) units, preferably wherein the BAC and DMS units are present in blocks. Block interpolymers of BAC and DMS and methods for the preparation thereof are described in U.S. Pat. No. 3,189,662-Vaughn, Jr., (incorporated herein by reference). The BAC-DMS interpolymers may be alternating, random block polymers of the —ABABA— type in which the blocks are polydisperse. Such interpolymers may be represented by the formula below and may include other interpolymerized monomer units (not shown):

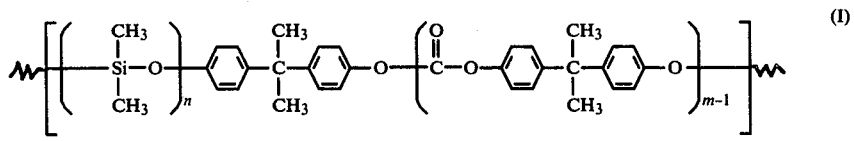

(I)

Additional teachings are provided in U.S. Pat. Nos. 3,419,634 (Vaughn) and 3,419,635 (Vaughn) on the preparation of silicone/polycarbonate copolymers.

The PSPC interpolymer $\overline{M}_w$ (weight average molecular weight) may be in the range from about 15,000 to about 150,000, n and m being numbers selected to accommodate these values for the interpolymer of formula I.

Preferably, the PSPC interpolymer is an alternating block interpolymer including from about 50 to about 60 percent by weight dimethylsiloxane (DMS) units and from about 20 to about 30 DMS units per siloxane block.

The PPO may be substituted or unsubstituted. Poly(2,6-dimethylphenylene oxide) is the preferred PPO, which preferably has an intrinsic viscosity greater than about 1.0.

PSPC and PPO polymers may be included in admixture in any suitable amounts relative to each other. Desirably, the PPO is included in an amount from about 0.5 to about 30 parts (preferably from about 1 to about 20 parts) by weight and the PSPC interpolymer is included in a corresponding amount of from about 99.5 to about 70 parts (preferably from about 99 to about 80 parts) by weight per 100 parts by the total weight of these polymers.

Each ultrathin film is less than about 500, and preferably less than about 400 angstroms in thickness. PSPC-PPO films may be, e.g., in the range from about 100 to 200 angstroms or less, while PSPC films may be, e.g., in the range from about 300 to 400 angstroms or less, in thickness.

The solvent for the casting solution may be selected from normally liquid hydrocarbon compounds having, e.g., from one to ten carbon atoms, and such compounds containing, e.g., halogen, nitrogen, oxygen or sulfur atoms and mixtures of the foregoing atoms and compounds.

The concentration of the polymer in the casting solution may be, e.g., up to about 15% by weight, and preferably is from about 20 to about 4% by weight.

The preferred solvent for PSPC interpolymers is 1,2,3-trichloropropane (TCP). The preferred solvent for mixtures of PPO and PSPC interpolymers is a mixture of equal volumes of trichloroethylene (TCE) and TCP. Perchloroethylene (PCE) is also suitable.

The preferred film-support liquid is water.

Suitable flexible microporous supports include, e.g., microporous polypropylene (available from Celanese Plastics Company under the trademark Celgard), Solvinert TM ultrafiltration membranes (available from Millipore Corporation), microporous nylon-reinforced poly (vinyl chloride-acrylonitrile) (available from Gelman Instrument Company under the trademark Acropor), microporous polytetrafluoroethylene (available from W. L. Gore and Associates, Inc. under the trademark GORE-TEX), and microporous polyethersulfone. Microporous polycarbonate resin membranes, which may be prepared as described in U.S. Pat. No. 4,032,309 (Salemme), are generally preferred.

The microporous supports may have any suitable thickness, e.g. from about 1 to about 10 mils, preferably from about 2 to about 5 mils.

Practice of the present invention is illustrated by the following non-limiting example. All parts and percentages given throughout this disclosure and the claims which follow are by weight unless indicated otherwise.

EXAMPLE

There was provided an apparatus substantially as illustrated in FIG. 1 except that the planar upper surface of the liquid bath was slightly higher than the top of the upstanding walls of the container; each of the wells 20 and 28 was defined by the convex meniscus formed adjacent a different one of a pair of rectangular rods resting atop the upstanding walls of the container with the rods disposed parallel to pick-up roller 42 and spaced in mutually opposite directions therefrom; and take-up roller 48 served also as the supply roller for this one-cycle test. Each well was about 0.05 inch wide and about 0.05 inch deep. The length of the wells was about 13 inches, the spacing therebetween was about 30 inches, the diameter of the pick-up roller (of stainless steel) was about 6 inches, and the axis of the 6-inch diameter driven take-up roller was rotatably supported about 24 inches above the pick-up roller axis. The pick-up roller was disposed midway between the wells with its axis about 1 inch above the surface of the 6-inch deep water bath employed.

A casting solution of 2 grams of a mixture consisting of 80% alternating block DMS-BAC PSPC (57% DMS; 20 DMS units per block; 43% BAC) interpolymer and 20% PPO (2,6-dimethylphenylene oxide) per 100 ml. of TCE-TCP solvent was prepared by dissolving the polymers in the solvent.

The support layer was a microporous Lexan ® polycarbonate resin membrane about 5 mils in thickness, 12 inches wide, and of sufficient length such that with its ends taped together it formed a taut endless web wrapped around the two rollers. Quantities of the above PSPC-PPO solution were introduced into burettes serving as dispensers 22 and 23 and sufficient portions thereof were slowly dispensed to fill the wells to their incipient spreading mode. Solution dispensing was continued to each well at a constant rate of about 0.05–0.10 ml. per minute and a thin solution film was observed to spontaneously spread from each well across the liquid surface toward roller 40. As the solution films were spreading with simultaneous solvent evaporation, the support web was continuously advanced at a rate sufficient to draw the resulting substantially solid membranes 26 and 34, each about 150 angstroms in thickness, onto the web to continuously form composite laminar membrane 46.

Tests showed that the composite membrane was effective for oxygen enrichment of air.

BEST MODE CONTEMPLATED

The best mode contemplated for carrying out this invention has been set forth in the description above, for example, by way of setting forth preferred process parameters, including but not limited to preferred materials and ranges and values of amounts, and other unobvious variables material to successfully practicing the invention in the best way contemplated at the time of executing this patent application. In casting the membranes, the casting solution is preferably initially filtered through a filter having pores of about 0.20 micron or less in diameter.

Many permeable membrane components of the composite laminar membranes which may be prepared by the process of this invention are found to be semipermeable, that is more permeable to one given substance than to another given substance. For example, PPO membranes are semipermeable in that they are more permeable to gaseous oxygen than to gaseous nitrogen.

Although the ultrathin laminar components have been described above with principal references to nonporous ultrathin membranes, this invention also encompasses preparation of composite laminar membranes including porous ultrathin membranes.

It is understood that the foregoing detailed description is given merely by way of illustration and that many modifications may be made therein without departing from the spirit or scope of the present invention.

What is claimed is:

1. A continuous process for preparing a composite laminar membrane including a flexible microporous support layer and two ultrathin permeable polymeric membranes, each of 500 angstroms or less in thickness, which comprises:
    (a) preparing two spontaneously spreadable casting solutions, each comprising a polymer capable of forming one of said ultrathin membranes and a volatile solvent;
    (b) providing a liquid substrate having two wells in the upper surface thereof, each well being designated for a different one of said solutions, said wells being spaced in mutually opposite directions from a region of said surface designated for removal of said composite membrane therefrom;
    (c) continuously supplying each of said casting solutions to its designated well at a rate sufficient to effect continuous and spontaneous spreading of the solution across the surface of the liquid substrate from its well toward said removal region;
    (d) removing at least enough of the solvent by evaporation from each casting solution as it spreads across said liquid surface to produce one of said ultrathin membranes on said liquid surface, each of said ultrathin membranes having a surface contacting said liquid and an opposite exposed surface;

(e) continuously passing a web of said support layer into contact with the exposed surface of one of said ultrathin membranes to continuously remove said one ultrathin membrane upwardly from said removal region with its exposed surface in contiguous contact with a surface of said support layer; and (f) continuously removing the other ultrathin membrane from said liquid surface such that said other ultrathin membrane is in contiguous contact with the liquid-contact surface of the ultrathin membrane removed in step (e).

2. The process of claim 1 wherein the pick-up angle between the direction of movement of said other ultrathin membrane in the floating mode at said removal region and the direction of movement of said one ultrathin membrane at said removal region is from about 45° to about 165°.

3. The process of claim 2 wherein said pick-up angle is about 105°.

4. The process of claim 3, wherein steps (e) and (f) are sequentially performed by passing the support web under a rotatable roller extending below the plant of said liquid substrate surface, and having its axis disposed in generally coplanar arrangement with the surface.

5. The process of claim 1, wherein at least one of the polymers comprises repeating units selected from the group consisting of arylene ether, organosiloxane, aromatic carbonate, alkyl acrylate, alkyl methacrylate, and blends, graft interpolymers and block interpolymers comprising one or more polymeric specie of the foregoing units.

6. The process of claim 5 wherein at least one of said polymers is a mixture of poly(2,6-dimethylphenylene oxide) and an organopolysiloxane-polycarbonate interpolymer.

7. The process of claim 5, wherein each of said polymers is an organopolysiloxane-polycarbonate graft or block interpolymer or a mixture thereof with substituted or unsubstituted polyphenylene oxide.

8. The process of claim 7 wherein the polyphenylene oxide is poly(2,6-dimethylphenylene oxide).

9. The process of claim 7, wherein said interpolymer includes repeating units comprising bisphenol-A carbonate units and dimethylsiloxane units.

10. The process of claim 9, wherein said interpolymer is an alternating block interpolymer including from about 50 to about 60% by weight dimethylsiloxane units and containing from about 20 to about 30 dimethylsiloxane units per dimethylsiloxane block.

* * * * *